(12) United States Patent
Reid

(10) Patent No.: US 7,156,998 B2
(45) Date of Patent: Jan. 2, 2007

(54) PHASED ACTIVATED SLUDGE SYSTEM

(75) Inventor: Terence K. Reid, Rockton, IL (US)

(73) Assignee: Aqua-Aerobic Systems, Inc., Loves Park, IL (US)

( * ) Notice: Subject to any disclaimer, the term of this patent is extended or adjusted under 35 U.S.C. 154(b) by 239 days.

(21) Appl. No.: 10/937,863

(22) Filed: Sep. 9, 2004

(65) Prior Publication Data
US 2006/0049103 A1    Mar. 9, 2006

(51) Int. Cl.
*C02F 3/30* (2006.01)

(52) U.S. Cl. .............. 210/605; 210/609; 210/614; 210/622; 210/623; 210/903; 210/906

(58) Field of Classification Search .......... 210/605, 210/609, 614, 621, 622, 623, 630, 903, 906
See application file for complete search history.

(56) References Cited

U.S. PATENT DOCUMENTS

| | | | |
|---|---|---|---|
| 5,137,636 A * | 8/1992 | Bundgaard | 210/605 |
| 5,213,681 A | 5/1993 | Kos | |
| 5,228,996 A | 7/1993 | Lansdell | |
| 5,354,471 A | 10/1994 | Timpany | |
| 5,603,833 A * | 2/1997 | Miller | 210/624 |
| 5,902,484 A | 5/1999 | Timpany | |
| 5,942,108 A | 8/1999 | Yang | |
| 6,312,599 B1 * | 11/2001 | Reid | 210/605 |
| 6,426,004 B1 | 7/2002 | Hiatt | |
| 2005/0205490 A1 * | 9/2005 | Park et al. | 210/605 |

FOREIGN PATENT DOCUMENTS

| | | | |
|---|---|---|---|
| JP | 2-284695 A | | 11/1990 |
| JP | 11-19684 A | | 1/1999 |
| JP | 11-216492 A | | 8/1999 |
| KR | 2002063052 | * | 8/2002 |

OTHER PUBLICATIONS

Web page: Aero-Mod SEQUOX Biological Nutrient Removal Process (www.areomod.net/sequox.cfm), date unknown.

* cited by examiner

*Primary Examiner*—Fred G. Prince
(74) *Attorney, Agent, or Firm*—Niro, Scavone, Haller & Niro

(57) ABSTRACT

The inventions describe a phased activated sludge treatment system that incorporates elements of batch treatment technology into a flow-through treatment process. Control of mixing and aeration systems are independent to facilitate the operation of the main reactor vessel in alternating aerated and anoxic conditions. Conditioning vessels in communication with the main reactor are employed to preferentially control the distribution and balance of nitrogen and phosphorus compounds in the reactor and to remove such biological nutrients concurrently with BOD and TSS in the wastewater. The inventions provide the beneficial results of providing greater operator control of flow-through treatment processes, power saving and reduced operation and maintenance costs in comparison to conventional flow-through treatment technologies.

5 Claims, 5 Drawing Sheets

PHASED ACTIVATED SLUDGE SYSTEM

FIELD OF THE INVENTION

The present inventions apply generally to the treatment of municipal and industrial wastewater using activated sludge processes. More specifically, the inventions are directed to activated sludge treatment processes carried out within flow-through wastewater treatment systems using time based process controls for aeration, nitrification, denitrification, phosphorus removal and related biosolids conditioning.

BACKGROUND OF THE INVENTION

Typical municipal and industrial wastewater contains pollutants expressed as biochemical oxygen demand (BOD). In a conventional flow-through wastewater treatment system which employs an activated sludge process for pollutant removal, the reactor vessel containing the activated sludge is continuously aerated as the wastewater passes through the vessel. Continuous aeration serves two purposes, it delivers oxygen to the active biomass of the activated sludge to sustain its ability to remove biochemical pollutants and it creates a turbulent flow condition in the vessel to thoroughly mix the activated sludge with the wastewater.

Aeration is conventionally accomplished with a combination of blowers and diffusers as are known in the art. Thus, two functions are preformed by the same equipment, namely, mixing and aeration. One of the disadvantages of using the same equipment for both the aeration and the mixing functions is that energy, a significant cost component of wastewater treatment, is not efficiently used. The blowers and diffusers of the aeration system run continuously, even if continuous aeration is not required to sustain the activated sludge. In addition, aeration promotes the nitrification of ammonia nitrogen ($NH_3$—N) into nitrate nitrogen ($NO_3$—N) which, while beneficial during treatment, may need to be removed later in the treatment process through denitrification.

Another disadvantage of a dual use or function aeration and mixing system is that the wastewater treatment plant operator is unable to control the balance between various beneficial forms of nitrogen in the activated sludge reactor vessel. Continuous aeration prevents the periodic or phased operation of the reactor vessel in an anoxic condition. Anoxic conditions in the reactor vessel both reduce the energy demand of the treatment process and allow for denitrification to occur before the treated flow passes through the vessel. Thus, there is a need for a flow-through activated sludge treatment process that provides for the phased operation of the reactor vessel either with or without aeration.

In addition to aeration, the reactor vessel in a conventional flow-through treatment process continuously receives a flow of return activated sludge (RAS) which has been recycled from a downstream solids separation phase. The RAS is reaerated in the reactor vessel, again imposing energy costs on the treatment process. Moreover, by reaerating the RAS, a source of bacterial solids that provide a food source for organisms that preferentially expel phosphorus is wasted. Thus, there is a further need for a flow-through activated sludge treatment process that provides for the phased conditioning and redirection of RAS prior to its return to the reactor vessel.

Along with the reduction of BOD, wastewater treatment systems must also provide processes for biological nutrient reduction (BNR) which includes the reduction of nitrogen and phosphorus concentrations in the wastewater effluent. BNR processes may be designed as separate sludge systems that conventionally take place after secondary clarification of a first stage of treatment. Such downstream removal processes require the expense of separate equipment, energy and chemical conditioning. Thus, there is a further need for a flow-through activated sludge treatment process that provides the ability to selectively remove non-preferential biological nutrients in a single sludge treatment system.

In certain embodiments of the inventions described herein, mixing and aeration operations in the reactor vessel are performed independently by equipment such as the MixAir® products of Aqua-Aerobic Systems, Inc. Thus, it is a feature and an advantage of these inventions that wastewater treatment process operators have independent control over mixing and aeration within the reactor vessel. Independent control, based on observed or measured conditions in the reactor vessel, allows for the regulation of aeration power to conserve energy without sacrificing necessary mixing. Also, such control capability permits the scheduling of anoxic periods in the reactor vessel to allow for nitrate reduction (denitrification).

In other embodiments of the inventions described herein, a reactor vessel with independently controlled aeration and mixing can be combined with a RAS separation vessel such as a phase separator of the general type described and referenced in U.S. Pat. No. 5,942,108 which is incorporated by reference. Thus, it is a feature and an advantage of these inventions that the bacterial solids of the RAS can be concentrated and separated from the RAS supernatant. The thickened solids from the phase separator can be diverted to an anaerobic vessel to enhance the nutrient removal process while the supernatant (containing proportionately higher concentrations of oxidized nitrogen) can be returned to the reactor vessel.

In other embodiments of the inventions described herein, an anaerobic vessel is positioned upstream of the reactor vessel and is in fluid communication with the phase separator. The anaerobic vessel receives thickened solids from the phase separator as a uniquely concentrated food source for organisms that preferentially expel phosphorus. Also, the phase separator diverts the RAS supernatant away from the anaerobic vessel, thereby isolating oxidized nitrogen from the anaerobic cell. Thus, it is a feature and an advantage of these inventions that phosphorus removal from the influent waste stream is enhanced in the reactor vessel. The ability to enhance phosphorus removal through the introduction of concentrated RAS solids to the anaerobic vessel reduces the cost of BNR treatment equipment, treatment chemicals and energy.

Further features and advantages of the inventions will be apparent to those of ordinary skill in the field of the invention from the more detailed description of certain embodiments of the inventions as described below.

SUMMARY OF THE INVENTION

In order to efficiently and effectively remove pollutants from a wastewater stream, the operator of a wastewater treatment process needs direct access, monitoring and control of the treatment process environments. With respect to physical components, the inventions comprise various combinations and permutations of: a) a reactor vessel wherein activated sludge is aerated and mixed with a wastewater stream requiring the reduction of BOD and nutrient concentrations; b) a separation vessel wherein RAS or a combination of RAS and mixed liquor suspended solids (MLSS) from the reactor vessel can be isolated into constituent components of concentrated or thickened solids and a supernatant; and, c) an anaerobic vessel which receives the majority of the wastewater influent stream and thickened solids from the separation vessel for nutrient removal. Optionally, the physical components may also include a vessel maintaining an anoxic condition for the reduction of nitrate nitrogen ($NO_3$—N) to nitrogen gas ($N_3$) in the MLSS recycled from the reactor vessel.

In addition to the physical components, process controls are available to the operator to regulate variables such as aeration power in response to measured conditions in the reactor vessel. Preferentially, dissolved oxygen (DO) monitors or oxidation-reduction potential (ORP) monitors are installed in or around the reactor vessel. Data collected from these monitors can be displayed to an operator or communicated to an automated control device such as, among other things a programmable logic controller (PLC) or elements of a supervisory control and data acquisition (SCADA) system as are known in the art. It is recognized that other instrumentation and other characteristics of the MLSS or the content of reactor effluent channel 53 can be measured and used to control the timing and duration of aeration phases in the reactor vessel such as by the use of one or more specific ion probes or respirometers.

These process controls allow the operator to create anoxic conditions in the reactor vessel and to alternate between anoxic and aerobic conditions. The aerobic and anoxic phases can be manually controlled by the operator, paced by a timer, or driven by measured data from the DO and ORP monitors. In combination, the physical components and process controls of the inventions permit a flow-through treatment system to obtain many of the benefits of batch treatment technology, allowing treatment to be performed on a time basis in a common reactor which would otherwise be accomplished by additional treatment vessels and capital equipment.

Using a phased activated sludge system enables the treatment process operator to reduce $NO_3$—N in the reactor vessel during an anoxic phase where existing BOD in the mixed liquor is metabolized using the oxygen present in nitrate in the absence of aeration. This reduces the normal internal sludge recycle requirements that multi-stage, flow-through activated sludge systems normally must provide to achieve effluent $NO_3$—N reduction. Further, when the treatment process operator can control the timing and duration of anoxic periods in the reactor vessel in combination with RAS and MLSS recycle control, the operator has real time control of the ratio of NH3—N to NO3—N in the reactor vessel. Thus, the operation of a phased activated sludge treatment process can eliminate the need for multiple anoxic basins and recycle flow requirements and result in, among other things, simplified piping and equipment layouts and reduced power costs.

Definition of Terms

The following terms are used in the specification and/or claims of this patent and are intended to have their broadest meaning consistent with the requirements of law:

anaerobic vessel—a vessel used in the treatment of wastewater in which anaerobic conditions are substantially maintained to selectively promote the growth of certain biological organisms or certain end products;

batch treatment—a method of treating wastewater by the conveyance of discrete volumes of wastewater through a treatment device as opposed to the substantially continuous flow of wastewater through a treatment device;

channel—any structure that conveys a fluid from one location to another, whether in the form of an open conduit, a closed conduit, a weir, a plenum, a passageway, an orifice or other structure;

continuous flow—a method of wastewater treatment performed in a series of vessels through which some amount of a wastewater is continually flowing (synonymous with flow-through); and vessel—any structure that confines a liquid volume.

Where alternative meanings are possible, the broadest meaning is intended. All words in the claims are intended to be used in the normal, customary usage of grammar, the trade and the English language.

Figure 1:
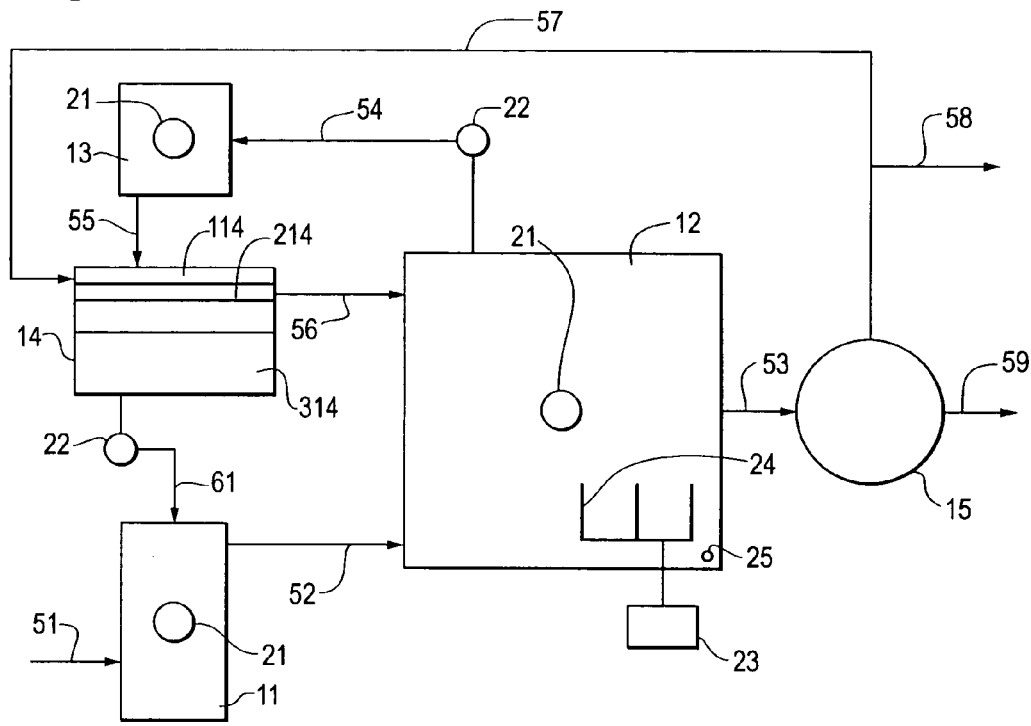
FIG. 1 is a process flow diagram of one embodiment of a phased activated sludge system shown from a plan perspective.

The process flow diagrams shown in FIGS. 1–7 indicate the conceptual arrangement of elements and direction of flow. The figures are not shown to scale and do not reflect the relative size, shape or nature of any particular vessel or conveyance.

DETAILED DESCRIPTION OF THE PREFERRED EMBODIMENTS

Set forth below is a description of what are currently believed to be the preferred embodiments or best examples of the inventions claimed. Future and present alternatives and modifications to these preferred embodiments are contemplated. Any alternatives or modifications which make insubstantial changes in function, in purpose, in structure or in result are intended to be covered by the claims of this patent.

In one preferred embodiment of the invention (see FIGS. 1 & 2), influent is directed into an anaerobic vessel 11. The influent can be a raw wastewater influent, but is more commonly the effluent from a previous treatment step such as screening, chemical conditioning or other primary treatment processes as are known in the art. The influent channel 51 conveys the wastewater into an anaerobic vessel 11. It will be understood that a single anaerobic vessel 11 (see FIGS. 1–7), or a plurality of anaerobic vessels (not shown), may be used as part of the present inventions, depending upon design parameters such as influent volume and pollutant load as are known in the art. Accordingly, other references to a single treatment vessel shall be understood to also encompass the equivalent design by means of multiple vessels.

In some embodiments of the invention (see FIGS. 3A, 5B, 6 & 7), the influent can be split by a plurality of influent channels 51 and directed to an anoxic vessel 13 in addition to the anaerobic vessel 11 to provide a source of food to the activated sludge in anoxic vessel 13. Preferably, the diverted influent is less than fifteen percent of the total influent, but may be greater due to variations in the quality of the influent and the contents of anaerobic vessel 11 and anoxic vessel 13.

The anaerobic vessel 11 also receives thickened solids delivered by pump 22 from a separator 14 via a solids channel 61. A mixer 21 operates in the anaerobic vessel 11 to combine the influent with the thickened solids. The mixer may be of any kind known in the art, but is preferably a direct drive mixer such as the AquaDDM® made by Aqua-Aerobic Systems, Inc. The anaerobic vessel 11 is operated in anaerobic conditions (DO at or near 0 mg/l) to accomplish the purpose of biological nutrient reduction, particularly with respect to reducing the total phosphorus concentration of the influent. Given a typical phosphorus concentration of 8 mg/l or less in influent channel 51, phosphorus concentrations leaving the treatment system are in the range of 0.10–0.50 mg/l. The beneficial phosphorus removal qualities of the inventions will still be obtained if the phosphorus concentration in influent channel 51 is greater than 8 mg/l, but will produce a proportionately higher range of effluent phosphorus concentrations.

The anaerobic vessel effluent is conveyed to the reactor vessel 12 via effluent channel 52 where it is mixed with activated sludge to create a mixed liquor. Reactor vessel 12 includes a mixer 21 and aeration equipment. The aeration equipment may be surface mechanical aeration such as the Aqua-Jet® aeration products of Aqua-Aerobic Systems, Inc. And similar products as are known in the art. Alternatively the aeration equipment may comprise a blower 23 and diffusers 24 of any type as are known in the art such as the ENDURADISC®, ENDURATUBE®, AQUA CB-12® and AQUA CB-24® aeration products of Aqua-Aerobic Systems, Inc. The mixed liquor is aerated to increase the available oxygen in the biomass and promote the interaction of the activated sludge biomass with the influent to reactor vessel 12. The biomass reacts with the influent to reactor vessel 12 prior to suspended solids removal in the clarification vessel 15. The reactor vessel 12 also includes instrumentation 25 that measures certain characteristics of the mixed liquor. Preferable the instrumentation 25 includes one or more of a DO sensor and an ORP monitor. The duration of the mixing and aeration is controlled by either a timing device or by the measurement of a characteristic of the mixed liquor, such as dissolved oxygen concentration or the oxidation reduction potential.

The reactor vessel 12 also receives supernatant from a separator 14 via separator channel 214 and supernatant channel 56. The supernatant contains significant oxidized nitrogen in the form of $NO_3$—N that is directed to reactor vessel 12 rather than anaerobic vessel 11 to avoid interference with the phosphorus removal mechanisms promoted in anaerobic vessel 11. The concentration of $NO_3$—N in the mixed liquor can be controlled by the sequencing of aeration and anoxic phases in the reactor vessel. Anoxic periods reduce the concentration of $NO_3$—N as the BOD of the mixed liquor requires oxygen. If the duration of the anoxic phase is sufficiently long, the $NO_3$—N concentration in the mixed liquor can be reduced to 0 mg/l (thus denitrifying the mixed liquor) prior to discharging the reactor effluent to the clarifier 15. As a result of this action, the removal mechanisms for nitrogen and phosphorus are significantly enhanced.

Additional denitrification capability is provided by connecting a separate anoxic vessel 13 to the reactor vessel 12. MLSS are recycled from the reactor 12 to the anoxic vessel 13 via an MLSS return channel 54. Preferably the flow through the MLSS return channel 54 is controlled by a pump 22. An anoxic vessel effluent channel 55 can convey the MLSS from the anoxic vessel 13 to the separator 14, or in an alternative embodiment, back to the reactor 12 (see FIGS. 3 & 3A). In some cases the extra denitrification may not be needed and anoxic vessel 13 can be omitted entirely (see FIGS. 4 & 7).

Separator 14 is preferably a phase separator of the type generally described in U.S. Pat. No. 5,942,108, but may be any device that performs the function of separating the solid and liquid phases of a fluid stream. The aeration and mixing means described as components of the phase separator of U.S. Pat. No. 5,942,108 are not required elements for the separator of the inventions described herein, but may be optionally included to support the overall operation and maintenance of the treatment system. The separator 14 receives RAS from clarifier 15 via RAS return channel 57. The RAS is preferably pumped to the separator 14, but may be conveyed by a gravity feed if elevations at the treatment site are favorable. The RAS return channel 57 discharges into separator influent channel 114. A pump 22 in communication with the solids zone 314 of separator 14 (see FIG. 2) is used to control the splitting of separator 14 discharge between the supernatant channel 56 and solids channel 61. Preferably, the separator discharge is split so that approximately 70 percent of the discharge is conveyed as supernatant through supernatant channel 56 to reactor 12 and 30 percent of the discharge is conveyed as thickened solids through the solids channel 61 to anaerobic vessel 11. Other flow splitting means and proportions of the separator discharge are also within the scope of the inventions and may be desirable depending on the characteristics of the wastewater to be treated and other performance factors as they are known to certified wastewater treatment plant operators and others of ordinary skill in the art.

The mixed liquor from reactor 12 is conveyed to clarifier 15 via reactor effluent channel 53 to separate settleable solids from the wastewater. Clarifier 15 provides the means for solids/liquids separation of the reactor effluent and may be of any type known in the art. Separated solids are either discharged as waste solids through waste channel 58 or are recycled as RAS through RAS channel 57 to separator 14. It is also within the scope of the inventions to direct RAS to one or more of reactor 12 and communicating channel 52. Clarified effluent is discharged through clarifier effluent channel 59 and may be conveyed to a tertiary treatment process such as various cloth media filtration systems (including, for example the AQUADISK®, AQUADRUM®, AQUADIAMOND® and AQUAABF® products of Aqua- Aerobic Systems, Inc.) or discharged to a receiving water if discharged permit limitations have been met.

It is recognized that most operators of wastewater treatment facilities have little or no control over the quality of the influent coming to the treatment plant they operate. Variations in domestic and industrial water use necessarily give rise to hourly, daily and seasonal fluctuations in influent wastewater quality. Thus, the inventions contemplate a full range of separator discharge proportions and RAS routing configurations to treat the varying pollutant loading characteristics of the system influent and to allow certified treatment plant operators the greatest range of flexibility in the treatment process.

Figure 3:
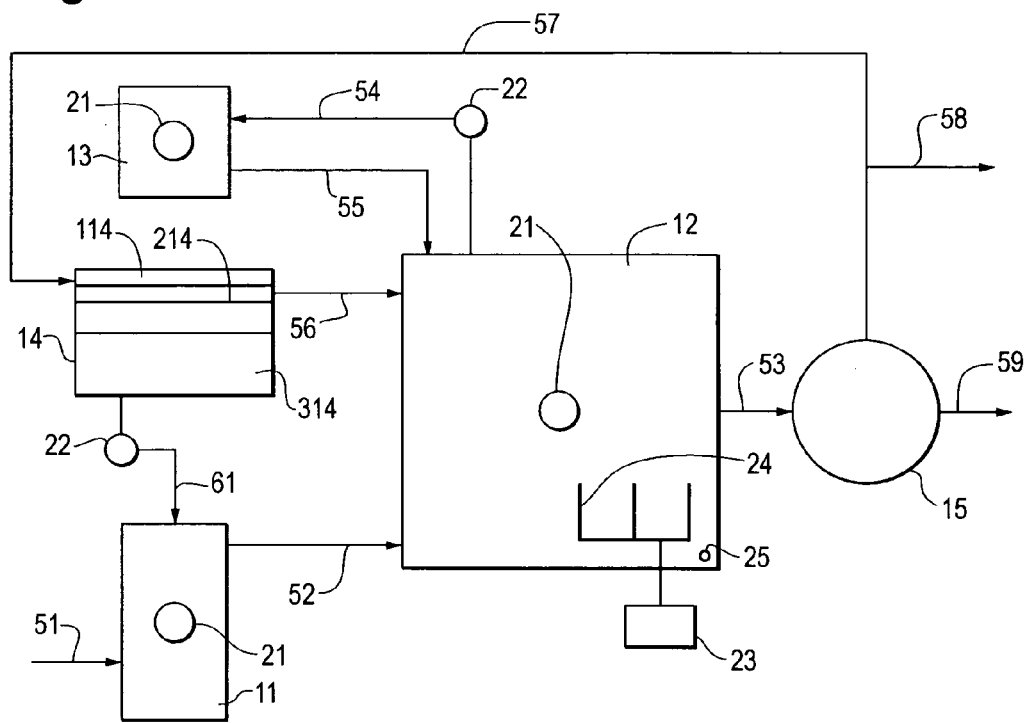
FIG. 3 is a process flow diagram of an alternate embodiment of a phased activated sludge system shown from a plan perspective.
Figure 3A:
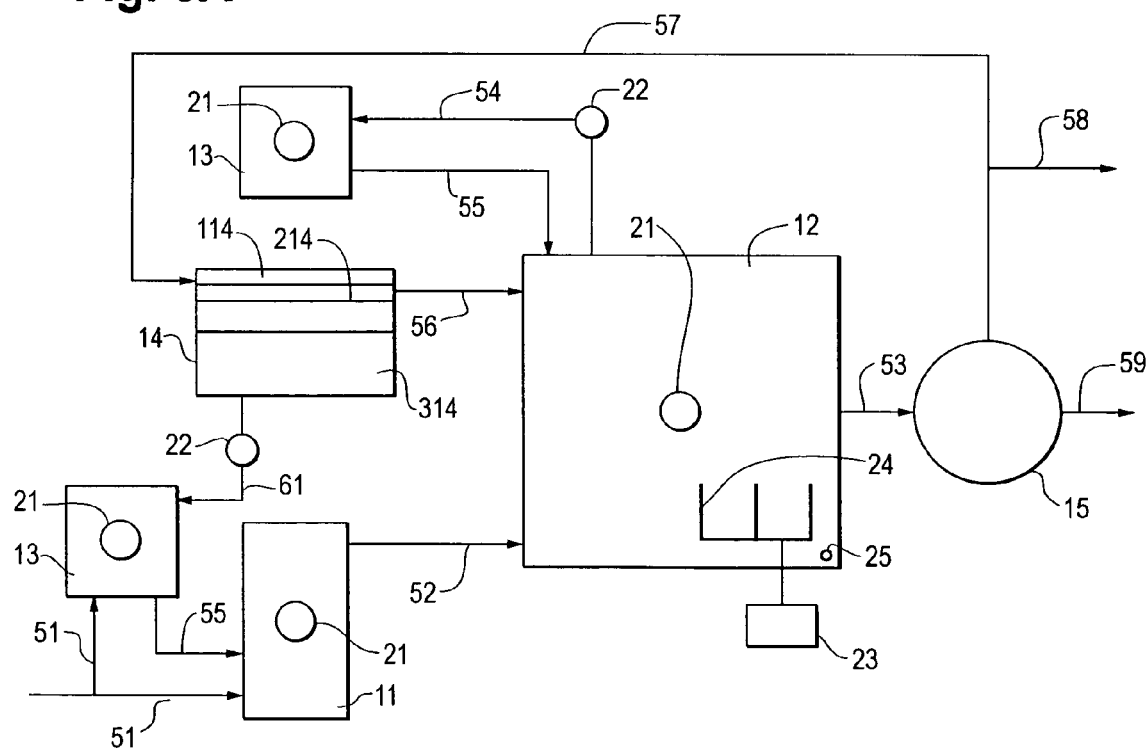
FIG. 3A is a process flow diagram of a preferred embodiment of a phased activated sludge system shown from a plan perspective.
Figure 4:
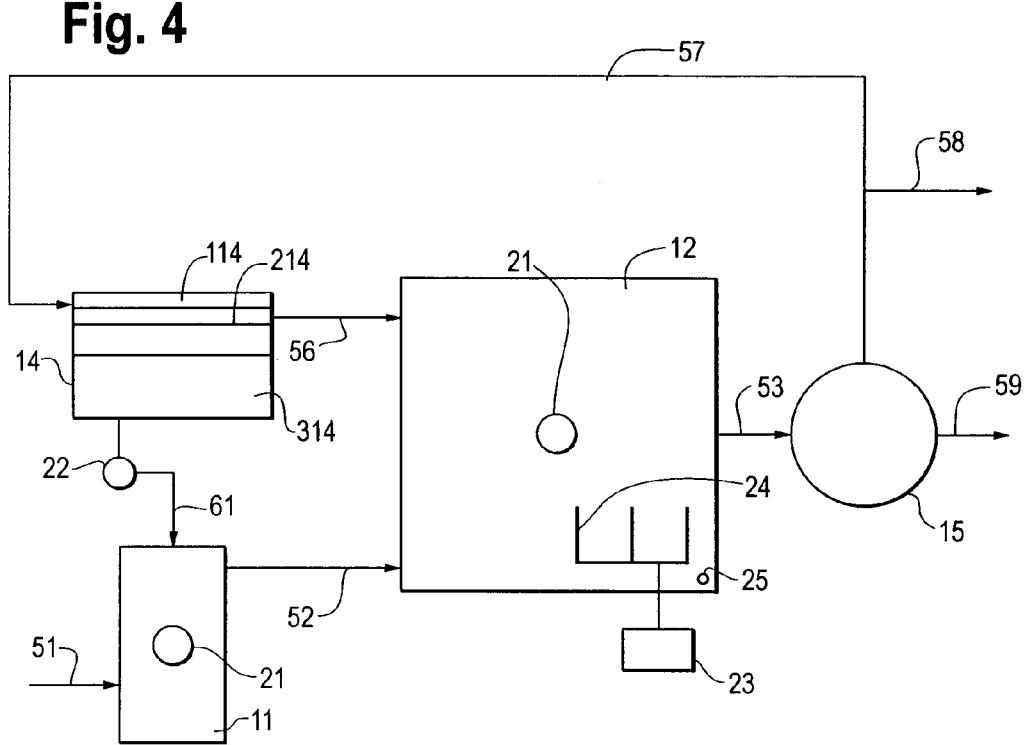
FIG. 4 is a process flow diagram of an alternate embodiment of a phased activated sludge system shown from a plan perspective.

In another preferred embodiment, a second anoxic vessel 13 is positioned upstream of the anaerobic vessel 11 (see FIG. 3A). In this embodiment, the second anoxic vessel 13 having mixer 21 may receive a portion of the influent from influent channel 51, typically less than fifteen percent of the total influent, as a food source for thickened RAS. In contrast to the embodiment of FIG. 1, the thickened solids from solids zone 314 of separator 14 are discharged to the second anoxic vessel 13 and not to anaerobic vessel 11. This diversion allows for the removal of oxidized nitrogen from the RAS prior to its introduction to the anaerobic vessel 11. Reduced concentrations of oxidized nitrogen in the RAS that enters anaerobic vessel 11 promotes the growth of a biomass in anaerobic vessel 11 that preferentially reduces phosphorus in the wastewater. An additional deviation from the embodiment of FIG. 1 is that the anoxic vessel 13 that receives recycled MLSS from reactor 12 returns the conditioned MLSS to reactor 12 instead of separator 14.

Figure 5:
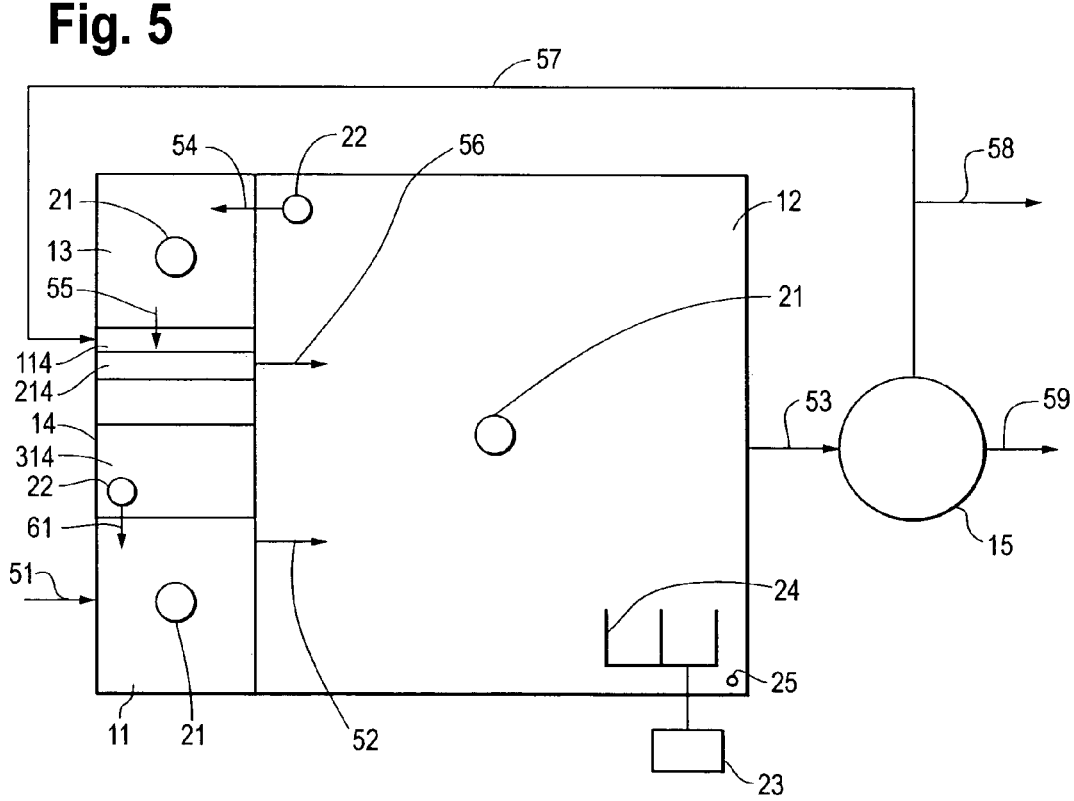
FIG. 5 is a process flow diagram of an alternate embodiment of a phased activated sludge system shown from a plan perspective.
Figure 5A:
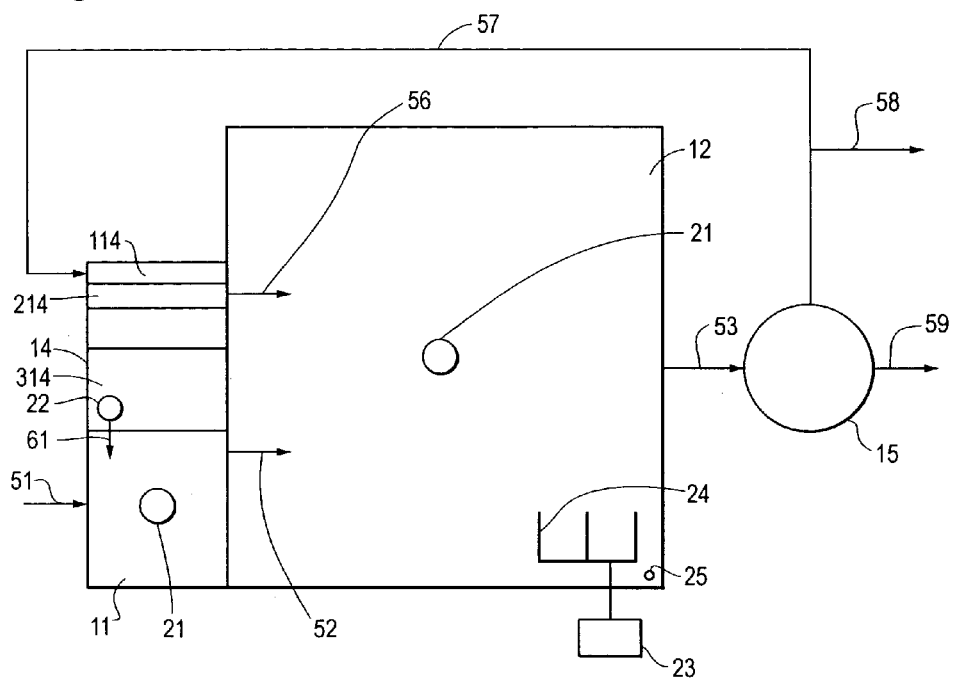
FIG. 5A is a process flow diagram of an alternate embodiment of a phased activated sludge system shown in a compact physical configuration without an anoxic vessel.
Figure 5B:
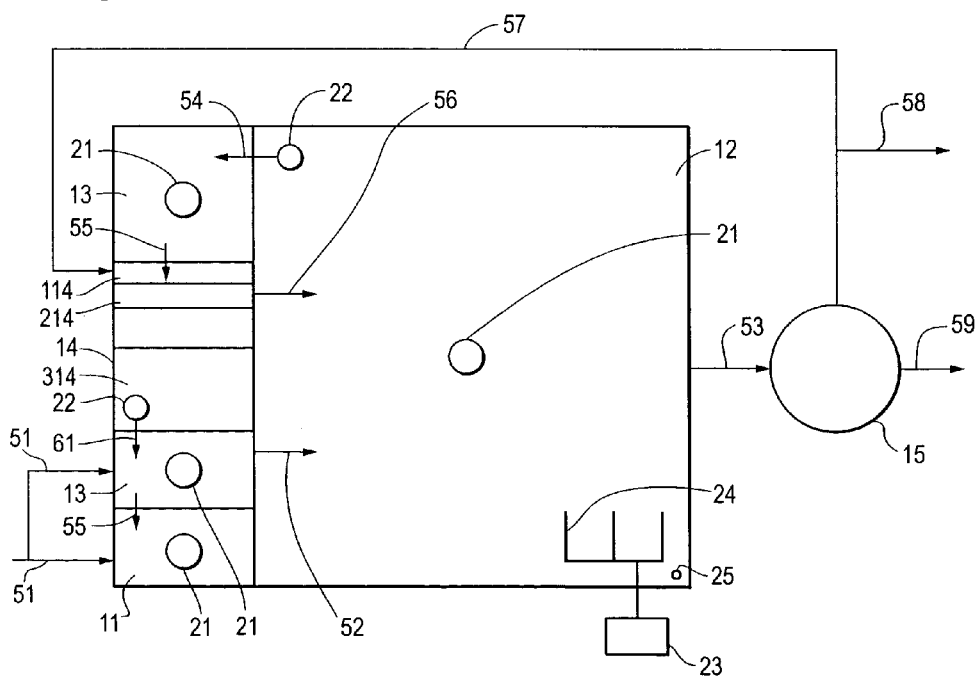
FIG. 5B is a process flow diagram of an alternate embodiment of a phased activated sludge system shown in a compact physical configuration with multiple anoxic vessels.

In another preferred embodiment of the invention the anaerobic vessel 11, reactor 12, anoxic vessel 13 and separator 14 can be configured to share common vessel walls in a compact configuration (see FIG. 5) to reduce capital cost and conserve space. The compact configuration may also be applied to embodiments that employ no anoxic vessel 13 (see FIG. 5A) as well as embodiments that employ an anoxic vessel 13 upstream of the anaerobic vessel 11 (see FIG. 5B). Again, the inclusion of one or more anoxic vessels 13 is optional depending on treatment needs and operator preference.

Figure 2:
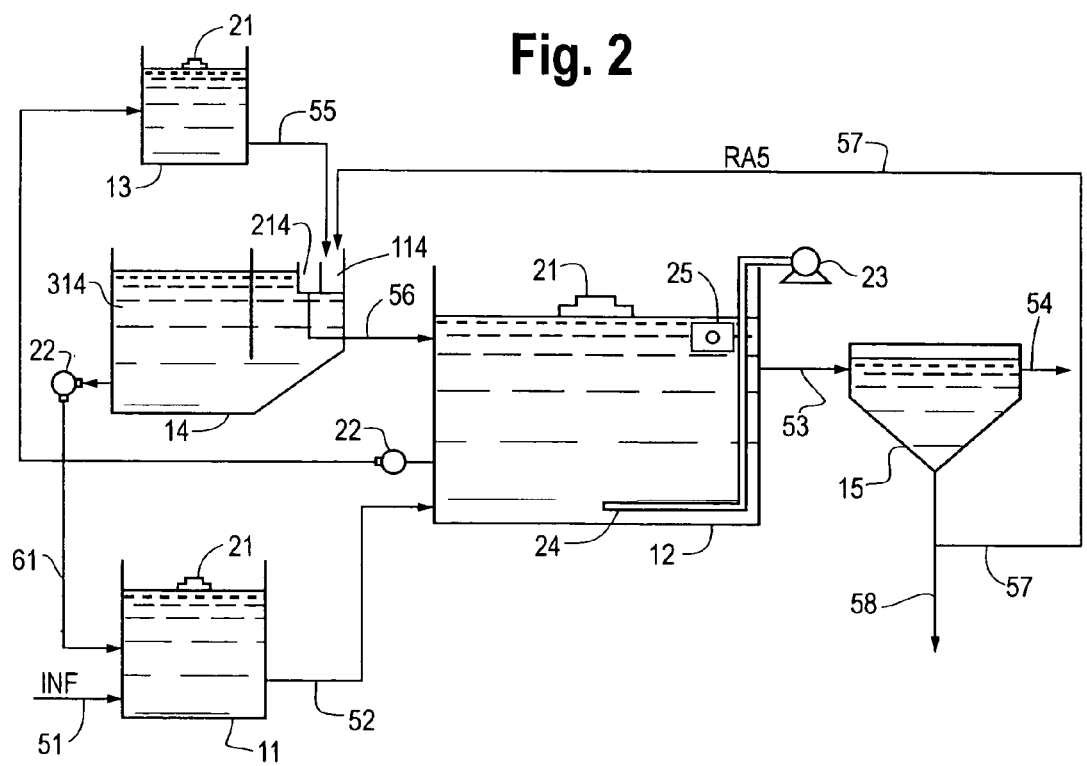
FIG. 2 is the process flow diagram of FIG. 1 shown from an elevation perspective.
Figure 6:
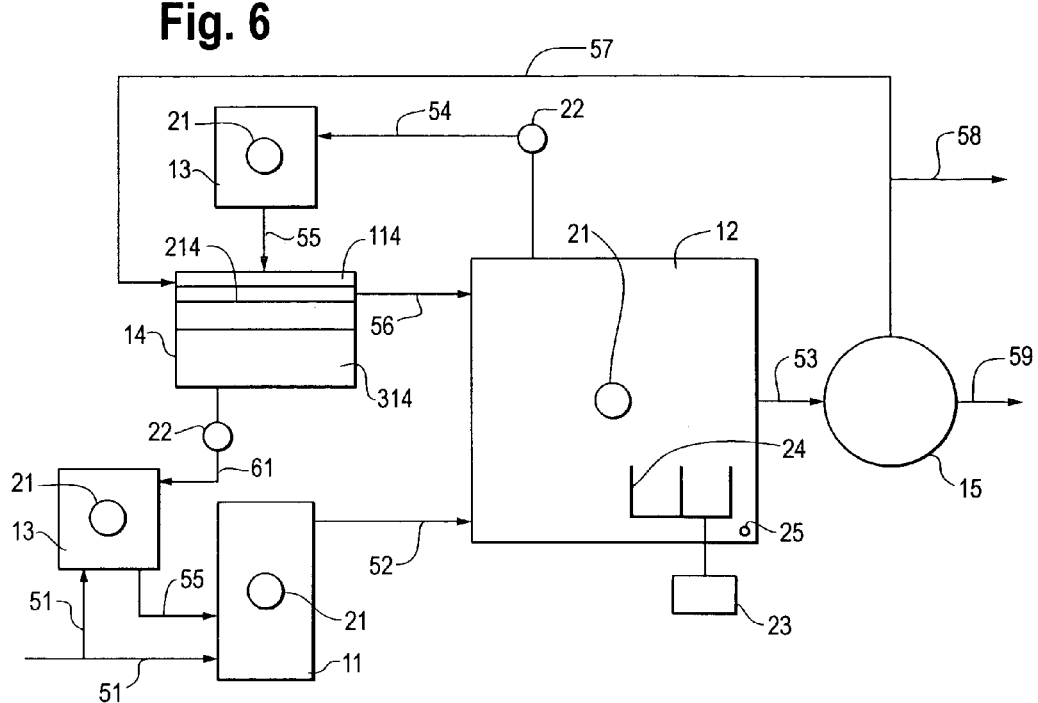
FIG. 6 is a process flow diagram of an alternative embodiment of a phased activated sludge system shown from a plan perspective.
Figure 7:
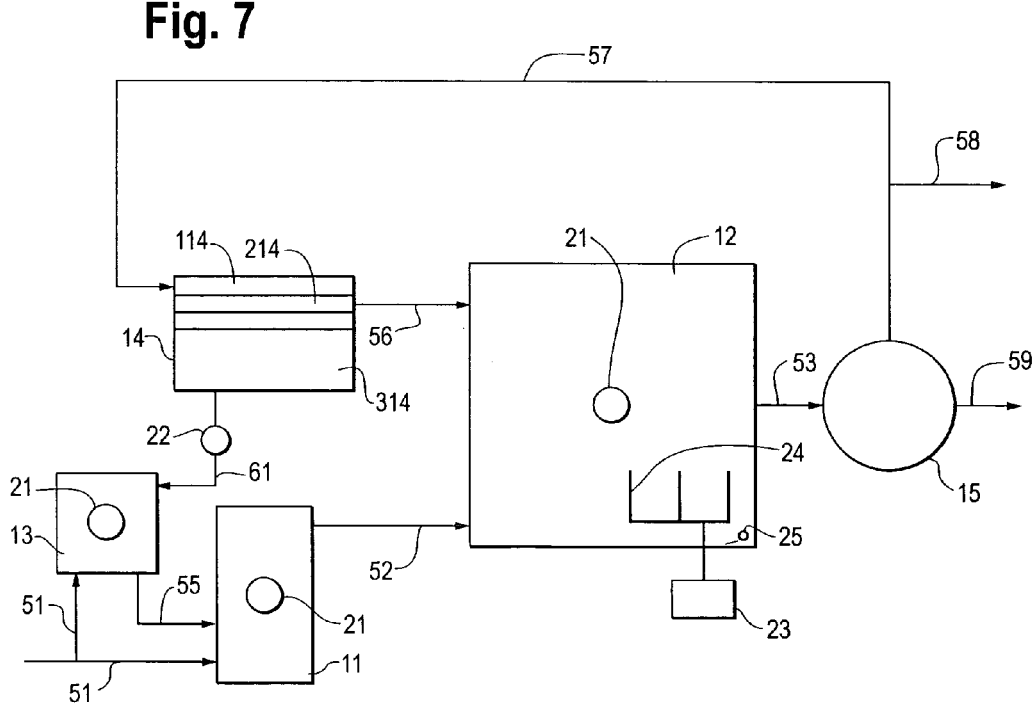
FIG. 7 is a process flow diagram of an alternate embodiment of a phased activated sludge system shown from a plan perspective.

In another preferred embodiment of the invention, an upstream anoxic vessel 13 may be incorporated into the configuration of the embodiment shown in FIGS. 1 & 2 for receiving the concentrated solids flow stream from phase separator 14 and discharge to anaerobic vessel 11 (see FIG. 6). Again, the inclusion of the initial anoxic vessel 13 is optional (see FIG. 7).

For all of the above described embodiments, it is recognized that instrumentation 25 can be incorporated into a supervisory control and data acquisition (SCADA) system or other automated control process.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

What is claimed is:

1. A continuous flow, activated sludge wastewater treatment process carried out in a wastewater treatment facility having an anaerobic vessel, a reactor vessel and a separator, said reactor vessel in communication with aeration equipment, said process comprising the steps of:
   combining in said anaerobic vessel a wastewater and thickened solids, said thickened solids obtained from said separator;
   operating said anaerobic vessel under anaerobic conditions and promoting the subsequent removal of biological nutrients from said wastewater before said wastewater is conveyed to said reactor vessel;
   receiving in said reactor vessel the wastewater discharged from said anaerobic vessel and a supernatant discharged from said separator;
   operating said reactor vessel in alternating aerated and anoxic phases;
   wherein the effluent from said reactor vessel following solid/liquid separation has a total nitrogen concentration less than or equal to 3.0 mg/l.

2. The process of claim 1 wherein the effluent from said reactor vessel following solid/liquid separation has a total phosphorus concentration less than or equal to 0.5 mg/l.

3. The process of claim 1 further comprising:
   alternating between said aerated phase and said anoxic phase in said reactor vessel based on a measured value for oxidation-reduction potential in said reactor vessel.

4. The process of claim 1 further comprising:
   alternating between said aerated phase and said anoxic phase in said reactor vessel based on a measured value for dissolved oxygen in said reactor vessel.

5. The process of claim 1 further comprising:
   controlling the time and duration of said aerated phase and said anoxic phase in said reactor vessel automatically, based on a measured property of the mixed liquor in said reactor vessel.

* * * * *